Jan. 24, 1950 J. W. WHITSON 2,495,491

CARD SELECTING APPARATUS

Filed May 20, 1944

INVENTOR.

John W. Whitson

Patented Jan. 24, 1950 2,495,491

UNITED STATES PATENT OFFICE 2,495,491

CARD SELECTING APPARATUS

John W. Whitson, New York, N. Y., assignor of one-half to Clare H. Whitson, New York, N. Y.

Application May 20, 1944, Serial No. 536,474

2 Claims. (Cl. 129—16.1)

This invention relates to improvements in the card selecting apparatuses shown in United States Patents 2,002,807 and 2,002,808 issued to me on May 28, 1935 and Patent 1,846,779 issued to me on Feb. 23, 1932; and is of the same species as in my Patent No. 2,379,943, granted July 10, 1945, my pending application for patent Serial Number 518,694, filed Jan. 18, 1944.

One of the objects of the invention is to provide means for aligning the edges of the cards relative to the card moving magnet so that each card will be influenced by substantially the same degree of magnetic attraction by the card moving magnet.

Another object of the invention is to provide for the association of the card aligning means with a means locking the selector members against movement whereby both means will operate together before the selector members will move.

Another object of the invention is to provide means associated with the movement of the selector members whereby the card moving magnet can only be energized after selector members have been moved from their normal position.

Another object of the invention is to provide for the operation of the card aligning means in association with a means for restoring the selector members to their normal position.

With the above mentioned and other objects in view, the invention consists in the novel construction and combination of parts hereinafter described, illustrated in the accompanying drawings, and set forth in the claims appended hereto, it being understood that various changes in the form, proportion, size and details of construction within the scope of the claims may be resorted to without departing from the spirit or sacrificing any of the advantages of the invention.

Figures 1, 2, 3, 4, 5:
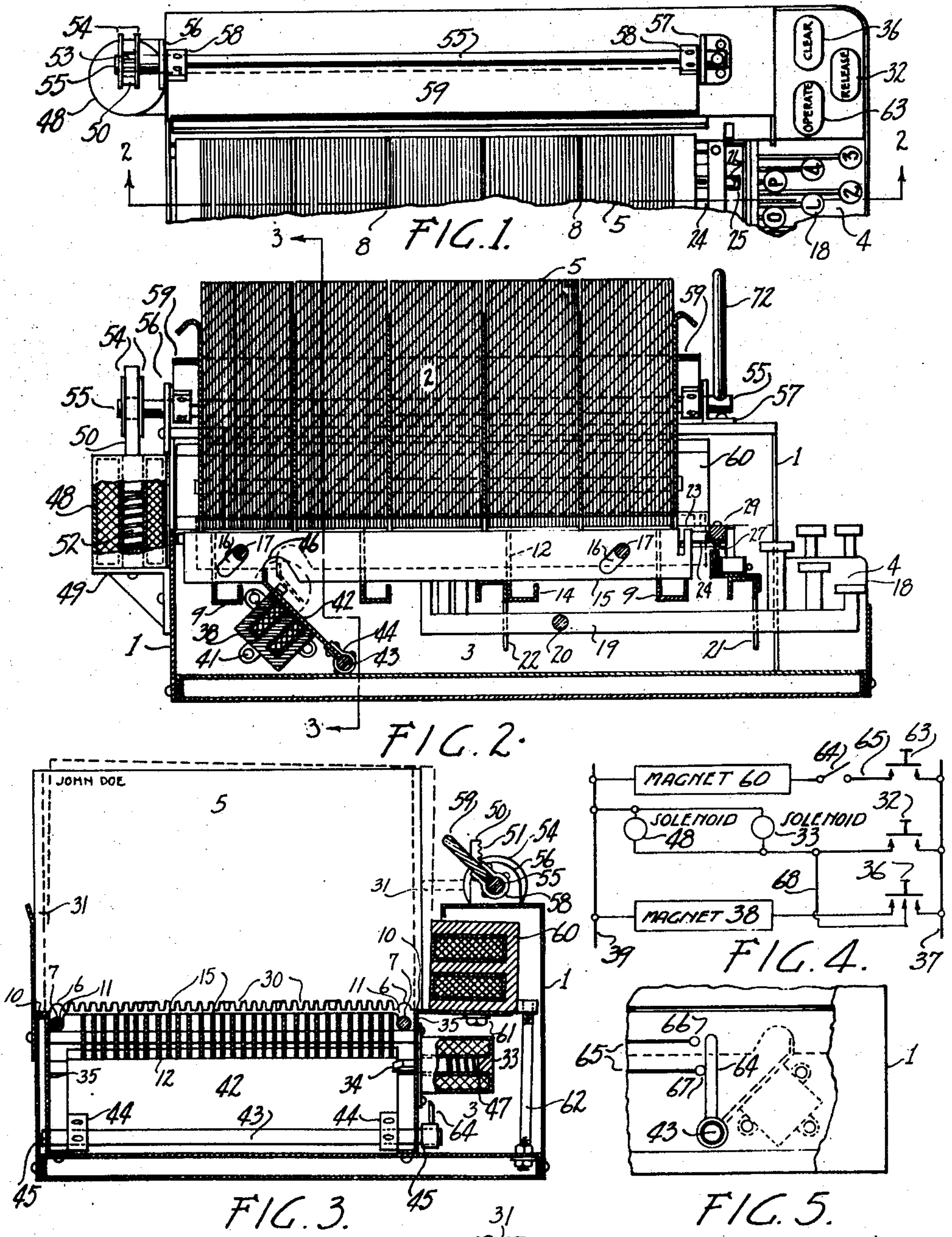
Fig. 1 is a partial plan view, the parts not shown being similar to those of Fig. 4 of Patent 2,002,808.
Fig. 2 is a longitudinal cross-section taken on line 2—2 of Fig. 1.
Fig. 3 is a lateral cross-section taken on line 3—3 of Fig. 2.
Fig. 4 is a wiring diagram.
Fig. 5 is a partial right side elevation view with the outer casing removed.

In detail the construction illustrated in the drawings comprises a casing 1, made up of a card compartment 2, a mechanism compartment 3 and a keyboard 4. Cards 5 are provided with recesses 6 on the bottom edges thereof and adjacent to each of the opposite sides thereof to be received on the carrier bars 7 of a card carrier. The carrier bars 7 of the tray or card carrier are adapted to engage the recesses 6 when removing the cards from the card compartment or installing the cards therein. The card supporting bars 7 are provided with a plurality of card spacing elements 8, adjustable throughout the length thereof, whereby a number of cards are confined between each pair of spacers. The bars 7 and the elements 8 form a part of the card carrier. A plurality of holders 9 are arranged laterally across the casing 1 between the front and rear ends thereof, the upper edges of the said holders lying in a common plane slightly below the line of the bottom face of card compartment 2.

The casing 1 is provided with supporting frames 35 each of which has a shoulder on its top edge at respectively opposite sides thereof which form the bottom supporting surfaces of the said compartment 2. When the cards are in the compartment the bottom edges thereof at the opposite corners rest on the upper face of shoulders 10 and the carrier bars 7 of the tray drop below the plane of the said shoulders 10 into recesses provided in the bottom of the compartment on opposite sides thereof between the shoulders 10. The holders 9 are provided with crosswise recesses 11 therein adjacent to each of the opposite sides thereof and disposed next to the opposite sides of the casing into which the longitudinally extended bars 7 of the card carrier are adapted to rest when said card carrier is placed within the card compartment 2. The card carrier supports all of the cards that are confined within the card compartment and the said carrier may be removed at will to permit various groups of cards supported in similar carriers to be removed to and from the compartment at will.

The holders 9 are provided with a series of elongated slots 12 cut down from an edge thereof and extending across the length of said cross members. The corresponding slots 12 of all of the holders 9 are in alignment with each other. The lower edge of each of the holders 9 is turned into a U section so that the edge 14 is bent upwardly to lie on a plane substantially flush with the bottom of slots 12.

A selector bar 15 is confined in each of the aligned slots 12 in the holders 9 each of said selector bars extending from a point rearward of the rearmost holder 9 to a point forward of the foremost holder 9. The upper edge of each of the selector bars 15 lies substantially flush with the upper edges of the holders 9. Each of the bars 15 has inclined slots 16 formed therein through which rods 17 extend, said rods being attached at their opposite ends to opposite sides of the inside supporting frames 35.

A plurality of finger keys 18 comprising the keyboard 4 are mounted on levers 19 which in turn are rotatively journaled on a cross bar 20. Each of the key levers 19 engages one of the selector bars 15 beyond the fulcrum bar 20. Thus when anyone of the finger keys 18 is depressed the opposite end of the key lever is moved upwardly causing a corresponding upward and forward movement of the related selector bar 15 within the limits of movement prescribed by the inclined slots 16 and the cross rods 17. Each lever 19 on the opposite sides of the pivotal axis 20 is confined in the respective guide members 21 and 22 which are substantially the same as holders 9 in the inverted position, to eliminate lateral play of said levers during movement thereof.

The forward end of each selector bar is provided with an arm 23 thereon to which one end of a cutter 24 is vertically and slidably and detachably secured. Each cutter member 24 consists of an inverted U-shaped element having one end attached to the selector bar as described, and the opposite end of said cutter provided with an opening through the face thereof, one edge of said opening being cut at an angle to provide a shearing or cutting edge. The details of the cutter member 24 being fully shown in Figs. 1 and 5 of Patent 2,002,808. The cutters 24 lie alongside of each other across the width of casing 1. The bottom face of each of the cutters rests on a spring finger 27, while the upper face of the cutters is confined below the bottom side of shear bar 29. The spring fingers engage the interior of their respective cutters 24 and tend to force the upper side of said cutters upwardly against the bottom side of the shear bar 29. The described method of mounting the cutters permits of a slack or "loose play" fit of said parts and the spring fingers 27 serve to hold each of the cutters in proper operating position. The spring tension of the finger on the cutter also supplies the necessary friction to maintain each selector bar in its elevated position. When the cutters are inoperative the outer ends thereof lie flush with the outer face of the shear bar 29. When any one of the finger keys is depressed, in addition to raising a corresponding selector bar 15, the movement of the selector bar causes the cutter attached thereto to be projected forwardly of the shear bar 29 into cutting position.

The cards 5 are provided with a plurality of spaced lugs or abutments 30 along the bottom edge thereof, the spaces between the plurality of lugs corresponding to the number of selector bars 15. Each of the lugs or the spaces between any pair of lugs may represent or be designated by any letters of the alphabet, or by numbers, or by any other emblems or indicia to suit the particular conditions of work of the card. The lugs or spaces on the bottom of the card are related to the finger keys on the machine whereby each key on the keyboard when depressed will always move its selector bar into a space on the bottom of the card corresponding with that key. The card 5 has magnetically attractable strips 31 cemented to a surface thereof at the opposite vertical edges. The cards must be responsive to magnetic attraction.

To this point the specification has substantially followed that of Patent 2,002,808 as to reference numbers and description because the parts are similar.

*Operation*

In order to prepare a card 5 so that it may be selected from a group of cards confined in the card compartment, the operator first depresses switch 32 to operate solenoid 33 and cause bolt 34 to be moved so as to release armature plate 42 for movement. Holding switch 32 depressed, the operator then depresses the first of certain of the keys 18 corresponding to the name or title or other key data that will distinguish that particular card from the other cards contained in the card compartment. The pressing of the first key will move its associated selector bar into its upmost position and the selector bar will in turn move armature plate 42 to its upmost position thereby releasing the balance of the keys 18 for movement as desired. The keys thus depressed will cause corresponding cutter members to be projected beyond the face of shear bar 29 as shown in Fig. 1. With the cutters in this position the card would have its lugs 30 on the bottom edge thereof dropped down into the openings 25 of the cutters, one edge 26 of opening 25 is cut at an angle to provide a shearing or cutting edge. The operator would then press switch 36 which is connected to power lead 37 and to electro-magnet 38 which in turn is connected to power lead 39. Electro-magnet 38 is mounted in the mechanism compartment 3 and is fastened at each end to the frames 35 as at 41. Armature plate 42 is fastened on rod 43 as at 44. Rod 43 extends between frames 35 and is journaled therein as at 45, one end of armature plate 42 contacts a notch 46 in each of the selector bars 15 so that upon the raising of any selector bar armature plate 42 will move with the selector bar and be raised from the face of electro-magnet 38 to a position as indicated in dotted lines in Fig. 2. When electro-magnet 38 is energized by closing switch 36 armature plate 42 will be attracted by and move toward electro-magnet 38 thus moving with it the raised selector bars to their downmost positions, this action will cause all of the cutters to be returned simultaneously to their concealed position which action of the cutters causes the lugs on the bottom edge of the card to be cut therefrom.

When armature plate 42 is in its downmost position bolt 34 is in the position shown in Fig. 3, locking armature plate 42 against electro-magnet 38 preventing any movement of armature plate 42 which in turn prevents any movement of the selector bars 15 and the keys 18 of the keyboard 4.

Solenoid 33 is contained in a casing having a flange piece which is fastened to frame 35. A spring 47 keeps bolt 34 in its extended position locking armature plate 42 against movement. Bolt 34 extends through a hole in frame 35 and has a shoulder which bears against frame 35 restraining its outward movement. When solenoid 33 is energized, bolt 34, which is the core of the solenoid, will be drawn into the solenoid thus unlocking armature plate 42 so that it can move when any key 18 is depressed and the selector associated with the depressed key is raised to its upmost position. Thus it can be seen that before the operator can operate the keyboard 4, the keyboard must be released for operation by pressing switch 32 which controls solenoid 33.

In the same circuit with switch 32 is solenoid 48 which operates the card aligning means. Solenoid 48 is mounted on bracket 49 which is fastened at the rear of casing 1. Solenoid 48 has a core 50 with a squared outward end on which is formed gear rack 51. The portion of core 50 that is normally in the solenoid is round in cross-section and the squared end projects through a square hole in the case of the solenoid so that the upward travel of the core is limited to the position shown in Fig. 2 being maintained in this position by the spring 52. Gear 53 is mounted between collars 54 on shaft 55 which is journaled in a rear bracket 56 and a front bracket 57 both of which are mounted on casing 1. Fastened to shaft 55 as at 58 is card aligning blade 59. When switch 32 is operated energizing solenoid 48, core 50 will be drawn downward into the solenoid compressing spring 52, rack 51 will rotate gear 53 and blade 59 will move to the position shown in dotted lines in Fig. 3, the edges of the cards contacting blade 53 will be moved to the left bringing the card edges into alignment at a substantially uniform distance from the card moving magnet 60. When switch 32 is released de-energizing solenoid 48, spring 52 moves core 50 to its extended position and blade 59 moves back to a position clear of the cards in the card compartment as shown in Fig. 3.

Electro-magnet 60 is mounted on the shoulder 10 of frame 35 being held thereto by cap screws 61, stud 62 adjustably holds electro-magnet 60 so that it may be tilted in relation to the vertical edges of the cards 5.

The card from which certain of the lugs have been cut or removed would then be placed in the card carrier in the card compartment 2 as shown in Fig. 3. The operator would then depress switch 32 and would then depress the first of the series of keys 18 corresponding to the cut out portions left on the cards as a result of the removal of the lugs, switch 32 would then be released and the balance of the series of keys would be depressed. The keys when depressed will move their selector bars upwardly into the cut out spaces between the lugs on the said card. The selector bars would also assume a position in the spaces between the lugs on all the other cards, in the card compartment, which either have or do not have cut out portions thereon. Obviously cards that do not have lugs cut from the bottom edge thereof could not have any lateral movement inasmuch as the width of the selector bar fits the space between any pair of lugs. However, on those cards where one or more lugs have been removed to provide a space between lugs greater than the width or thickness of the selector bars then such cards can move laterally relative to the selector bars extended between lug spaces thereon. After the desired number of keys have been depressed and the selector bars engaged with the aforesaid selector spaces on the bottom of the cards the operator would depress switch 63.

Connected into wire 65 of the circuit of switch 63 is contactor 64 which is mounted on and insulated from the extension of rod 43. Contactor 64 rotates with rod 43 and makes contact with contacts 66 and 67 by sliding over the top of the same only when armature plate 42 is in its upper position. Thus electro-magnet 60 cannot be energized until switch 32 has been operated to energize solenoid 48 and align the cards in the card compartment in relation to electro-magnet 60. The pressing of switch 32 also releases the keys 18 for operation, this function has already been described. The magnet 60 will not operate upon closing switch 63 unless at least one key 18 is first depressed to move armature 42 upwardly to close switch 64.

When electro-magnet 60 is energized, by pressing switch 63, a card having cut out portions corresponding to the series of depressed keys 18 would be magnetically attracted to electro-magnet 60, moving to the magnet in an arcuate path as indicated in dotted lines in Fig. 3. The selected card would be removed from the card compartment and switch 36 would be pressed to return the raised selector bars to their normal positions in readiness for the next card selection. The armature plate 42 serves as a restoring member for the selector bars 15. When the bars are in their raised positions, the downward movement of armature plate 42 will restore the raised selector bars to their downmost positions.

Wire 68 connects switch 36 with the circuits of solenoids 33 and 48 so that blade 59 will operate to align the cards as already described, and core 34 of solenoid 33 will also be moved as already described, when switch 36 is operated. It is optional to have wire 68 join the circuits as described, when wire 68 is not included the beveled latch end of the core 34 will contact the edge of armature plate 42 with the result that core 34 will move aside so as not to obstruct the movement of plate 42 toward electro-magnet 38. Employing switch 36 to operate the card aligning means serves to align the lugs 30 of each of the cards with the selector bars 15 so that the selector bars may more readily enter the spaces between the lugs on a subsequent card selection, this reduces wear on the side edges of the lugs because of reduced frictional contact with the selector bars.

Fig. 4 shows the circuits of switches 32 and 36 arranged for simultaneous operation of the electromotive devices controlled by them, however it is permissible to provide stepping relays for operating the electromotive devices in sequence rather than in unison so that solenoid 48 will operate before solenoid 33 and that both solenoids will operate before electro-magnet 38, the object being to align the lugs 30 in relation to the selector bars so as to reduce frictional contact and wear between the selector bars and the lugs on the cards. A stepping relay may be arranged in the circuit of switch 63 so that solenoid 48 would be energized and deenergized to operate the card aligning mechanism and the electro-magnet 60 then energized to move a desired card. The pressing of switch 63 would set the stepping relay in motion and the release of switch 63 would act to reset the relay to its starting position and also de-energize magnet 60.

Figure 6:
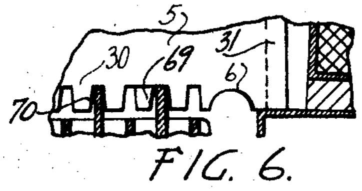
Fig. 6 is an enlarged view of the lower right hand corner of a card.
Figure 7:
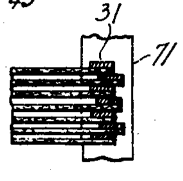
Fig. 7 is a sectional plan view of a group of cards showing the edges of the cards in relation to the face of the card moving magnet before the cards have been aligned by the card aligning means.

From the description thus far it can be seen that the cards are held from movement to electro-magnet 60 by the lugs 30 on the bottom edge of each of the cards contacting the selector bars 15, this is also the case in Patents 1,846,779, 2,002,807 and 2,002,808. The continued attraction of magnet 60 on the cards causes the lugs 30 to become worn on their side edges nearest the magnet 60 as indicated at 69 in Fig. 6. When the cards are new the lugs are as shown at 70. The result of this difference between new and worn lugs means that the cards will always vary as to alignment in relation to magnet 60 as indicated in Fig. 7, line 71 representing the face of electro-magnet 60. When all of the cards are new this condition does not exist but as the cards age the lugs 30 vary in the degree in which they are worn with the result that the cards themselves vary in alignment in relation to the magnet 60, this variation means that cards closer to the magnet receive a greater degree of magnetic attraction than other cards, experience has shown that the variation is such that many of the cards do not receive the degree of magnetic attraction that will cause them to move to electro-magnet 60. The cards whose edges are closer to magnet 60 "absorb" the magnetic field and the cards whose edges are too far away become inoperative.

When the cards are aligned as provided in this invention, the cards when attracted by magnet 60 will tend to move en masse toward the magnet, the card or cards whose cut out portions correspond with the selector bar setting continue to move to magnet 60 in the arcuate path indicated in Fig. 3, those cards whose lugs are worn will continue to move toward magnet 60 until arrested by the selector bars, those cards whose lugs are not worn will be immediately arrested against movement toward magnet 60 by the selector bars, Fig. 7 shows how a group of card edges could look after being attracted to magnet 60. The present invention provides that the card moving magnet will attract new and old cards with substantially equal magnetic force.

Patents 1,846,779 and 2,002,808 show no means for aligning their cards in relation to their card moving magnets. Patent 2,002,807 shows a card aligning means in the magnet 16 which aligns the card edges in relation to itself, for this magnet to align the card edges in relation to the card moving magnet 15 provision must be made that the cards will always remain a uniform size after manufacture and will not vary in size when subjected to varying conditions of humidity, since cards made of standard commercial paper stocks will vary in size due to this cause this invention provides that the card edges adjacent the card moving magnet will be aligned instead of the opposite edges as in Patent 2,002,807 with the advantage that the cards may be made of standard commercial paper stocks instead of special paper stocks.

The present invention also provides for its card aligning means to be operative in association with the movement of its selector members while Patent 2,002,807 makes no such provision.

The card aligning mechanism may also be manually manipulated by lever 72 which rotates shaft 55, in this case the card aligning blade 59 will be moved to align the cards and blade 59 may be held in contact with the card edges and magnet 60 energized to bring the card edges in closer contact with blade 59 and into closer alignment than would otherwise be possible, lever 72 would then be released and magnet 60 energized to move the desired card as hereinbefore described.

Having now described and illustrated one form of my invention, I wish it to be understood that my invention is not to be limited to the specific form or arrangement of parts herein described and shown, except as set forth in the appended claims.

Having thus described this invention what I claim and desire to secure by Letters Patent is:

1. In a system of electrical circuits which includes means for opening and closing the circuit of a card moving magnet that is common to all of the cards of a card selecting apparatus in which magnetically attractive cards are engaged by selectively movable selector members that are common to all of the cards: the combination of a second means in the electrical circuit of the said card moving magnet for opening and closing the said circuit and means controlled by the selector members for operating the second named means.

2. In a card selecting apparatus in which a set of magnetically attractive cards are selectively locked against movement by selectively settable selector members that are common to all of the cards and a card moving magnet adjacent an edge of the set of cards moves cards not locked out of alignment with locked cards, the combination with a system of electrical circuits, of means for opening and closing one of said circuits including a card moving magnet to move magnetically attractive cards said card selector members having a connection to said means for operating the opening and closing of said circuits.

JOHN W. WHITSON.

REFERENCES CITED

The following references are of record in the file of this patent:

UNITED STATES PATENTS

| Number | Name | Date |
|---|---|---|
| 1,790,453 | Anderson | Jan. 27, 1931 |
| 1,846,779 | Whitson | Feb. 23, 1932 |
| 2,002,807 | Whitson | May 28, 1935 |
| 2,002,808 | Whitson | May 28, 1935 |
| 2,146,063 | Gardin | Feb. 7, 1939 |
| 2,331,471 | Holleck | Oct. 12, 1943 |
| 2,379,943 | Whitson | July 10, 1945 |